United States Patent [19]

Brown

[11] 4,390,980

[45] Jun. 28, 1983

[54] DEMULTIPLEXING PLURAL DATA STREAMS

[75] Inventor: Charles A. Brown, Chelmsford, Mass.

[73] Assignee: Control Data Corporation, Minneapolis, Minn.

[21] Appl. No.: 287,450

[22] Filed: Jul. 27, 1981

[51] Int. Cl.³ .................. H04J 11/00; H04J 15/00
[52] U.S. Cl. ................................ 370/19; 370/119; 360/137
[58] Field of Search ................. 370/18, 19, 20, 21, 370/22, 77, 78, 79, 119; 375/38, 39, 100, 103; 364/572; 360/137, 18

[56] References Cited

U.S. PATENT DOCUMENTS

| 3,204,034 | 8/1965 | Ballard et al. ............ 370/21 |
| 4,281,409 | 7/1981 | Schneider ................. 370/19 |
| 4,293,953 | 10/1981 | Gutleber ................. 370/18 |

Primary Examiner—Douglas W. Olms
Attorney, Agent, or Firm—Edward P. Heller, III; Joseph A. Genovese

[57] ABSTRACT

A method is presented for demultiplexing two or more streams of data multiplexed in a phase shifted arrangement. Demultiplexing is accomplished by multiplying the composite signal by an individual correlator signal for each data stream, each correlator signal being mutually orthogonal with the other correlator signals.

18 Claims, 3 Drawing Figures

DEMULTIPLEXING PLURAL DATA STREAMS

BACKGROUND OF THE INVENTION

1. Field of the Invention

The invention relates generally to the fields of data processing, recording and transmission, and more particularly to data multiplexing and demultiplexing techniques.

2. Brief Description of the Prior Art

In the area of recording data on physical media, such as on magnetic disks and tapes, or by means of electronic beams, there exists a need to space adjacent tracks of data closely together. Many elaborate techniques have been developed to achieve these ends, but these all have had the characteristic of recording and reading one track of data at a time. However, it is often difficult to maintain the narrow track spacing necessary for single track reading. In electron beam recording, for example, written data tracks "spread" on recording, thereby making it difficult to maintain well-defined single tracks.

Similarly, in the field of data transmission, there exists the need to transmit multiple data streams over a single channel. This need has been addressed in the past using time division techniques, such as multiplex telegraphy, as well as frequency multiplexing schemes, such as frequency interleaving methods used in color television. However, none of these approaches is satisfactory to high speed digital data transmission.

The present invention, therefore, primarily concerns the demultiplexing of several data streams simultaneously. In the data recording art, the invention is particularly useful for reading several data tracks simultaneously, thereby reducing the need for maintaining track spacing. In the data transmission art, the invention is useful for demultiplexing a composite signal, consisting of two or more data streams.

SUMMARY OF THE INVENTION

In accordance with the present invention, streams of data, encoded in a polarized code, are phase shifted relative to one another by a predetermined phase shift. During demultiplexing, all streams are read or received simultaneously to derive a composite signal. The individual data streams are separated from one another by means of a separate correlator signal for each stream. Each correlator signal may be identical to the others but phase shifted from the others by the amount of phase shift of its associated data stream. Alternatively, one or more data streams may be regarded as interference against a desired data stream, and may be suppressed by ignoring this correlator's outputs.

As used herein, the term "polarized code" means a code having a first state representing a first binary value and having a second state representing a second binary value. For example, in the data recording art the term "polarized code" means a code having distinct polarized transitions representing distinct binary values. In the data transmission art the term "polarized code" means a code having distinct signal levels representing distinct binary values. One example of a polarized code is the Manchester code where a positive-going transition at cell center represents a "one" bit whereas a negative-going transition at cell center represents a "zero" bit. This is distinct from NRZ1 codes (where transitions occur only at each "one" bit) and MFM codes (where transitions occur at cell center of each "one" bit and between successive "zero" bits). Thus, since transition directives are not necessarily representative of binary values in NRZ1 and MFM codes, they are not "polarized codes" within the meaning of the present invention. Another example of a polarized code is a binary signal where a first voltage or current value represents a "one" bit and a second voltage or current value represents a "zero" bit. Although both codes are usable for data recording and transmission, Manchester codes are more frequently used on data recording and binary signals are more frequently used in data transmission.

As used herein, the term "stream of data" (or "data stream") means data in the form of either encoded signals or transitions recorded on a medium or in the form of a signal having signal levels being transmitted.

In accordance with the present invention, the composite signal consisting of two or more streams of data in phase-shifted polarized code is demultiplexed by a correlator signal for each stream. A correlator signal comprises a negative segment followed by a positive segment with the transition between the segments centered to be substantially coincident with the bit information transitions of the polarized code of the respective data stream. For example, with Manchester code wherein the bit-information transition occurs at cell center, the correlator signal is arranged such that transitions between the negative and positive segments also occur at cell center. With a binary code where the transition between signal values occurs at cell edge, the correlator signal is arranged such that the transition between the negative and positive segments occurs at cell edge. Separate multiplication of the composite signal by the separate correlator signals results in separate resultant signals having on the average a positive segment for each "one" bit transition and a negative segment for each "zero" bit transition for the respective data streams.

DESCRIPTION OF THE PREFERRED EMBODIMENT

Figure 1:
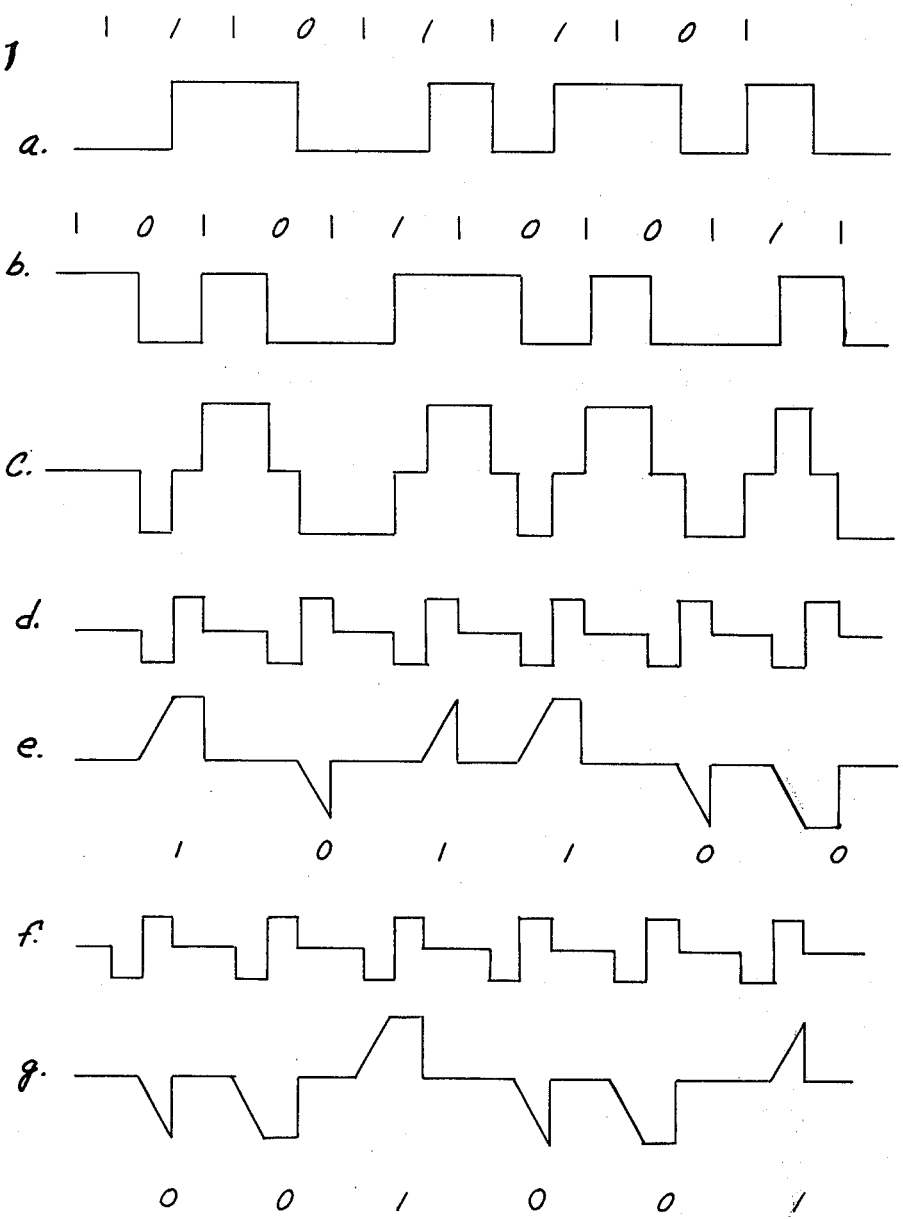
FIG. 1 is a diagram of waveforms illustrating two Manchester coded bit streams (a., b.), their composite encoded signal (c.), their two correlator signals (d., f.), and the two integral resultant signals (e., g.).

With reference to FIG. 1, and considering only the data recording art, the top two subfigures (a. and b.) represent two bit streams of data as written on adjacent tracks on a recording surface, or as transmitted over a single data channel. These may, for example, be adjacent tracks on a magnetic disc or tape, or they may be adjacent portions of an electron beam memory. The bits in FIG. 1a are phase shifted one quarter of a cycle behind the bits in FIG. 1b. This represents a phase difference between the two bit streams of 90°. (90° is a somewhat arbitrary phase difference, as will become more apparent in the discussion infra.)

The Figs. also show in solid line the bits in a Manchester polarized code. In a Manchester code, the direction of change of a physical parameter such as flux determines the state of a bit, either zero or one. In the figure, an upwards or positive transition at cell center represents a one bit and a downwards or negative transition at cell center represents a zero bit.

The two bit streams, when recorded on physical media, are written on adjacent tracks, phase shifted by 90°. If the tracks are sufficiently close together, one read head will read the data from both tracks simultaneously. If the read head alignment is such that it will read each track with equal amplitude, the composite waveform of the two track read will approximate the square waveform of FIG. 1c.

A correlator signal for demultiplexing the waveform of FIG. 1a is represented by FIG. 1d, and a correlator signal for demultiplexing the waveform of FIG. 1b is represented by FIG. 1f. Inspection of the Figs. will show that correlator signal 1d lags correlator signal 1f by 90°, corresponding exactly to the phase shift between the two data tracks.

Each correlator may have the same signal pattern, namely: a negative square wave segment followed by a positive square wave segment with the transition between the two segments occurring coincident with the transition in the respective data track, which in the case of Manchester code is at the center of the bit cell (FIG. 1*l* or 1*b*). However the square wave segments should be regarded only as convenient representatives of a general class of correlator signal patterns suitable for separating out the desired data streams, the class characterized by the single constraint of having each signal pattern be orthogonal to the others.

Multiplication of the correlator signals 1d and 1f with the composite signal 1c, and integration of the resultant over the period of the duty cycle, yields the integral signal patterns of FIGS. 1e and 1g. The integral signals 1e and 1g have positive and negative segments corresponding to the duty cycles of the respective correlator signals, the positive state and the negative state representing respectively a one bit or a zero bit of the corresponding data stream. Thus, the state of the segments in FIG. 1e corresponds to the bit pattern of the FIG. 1a bit stream, and the state of the segments of FIG. 1g corresponds to the bit patterns of the FIG. 1b bit stream.

Figure 2:
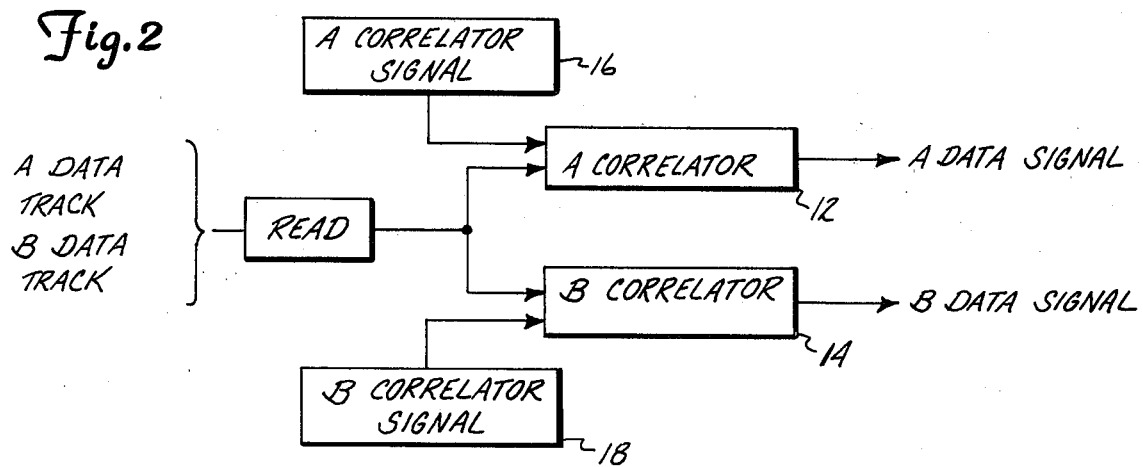
FIG. 2 is a schematic diagram of the demultiplexer electronics.

Apparatus for reading and demultiplexing a two-track read or multiplexed channel is illustrated in FIG. 2. The two tracks (channels) are read simultaneously by read head 10, the output of which is fed separately to A correlator 12 and B correlator 14. Each correlator has a second input from a correlator clock or pattern generator, 16 or 18, which generates the signal patterns illustrated in FIGS. 1d and 1f with the appropriate phase shift between them. The correlators 12, 14 each multiply the combined signal from read head 10 with the respective correlator signal from either generator 16 or 18. The resultant signal is integrated to form the integral signal 1e or 1g, which is then analyzed for its positive or negative value. The results of this analysis may be used to set a flip-flop for transition to downstream electronics.

Analog circuits for performing the above mathematical functions are well known. Digital techniques may also be employed. Also the multiplication may be implemented by using well-known analog filter methods, thus eliminating the need for formal multiplication.

Figure 3:
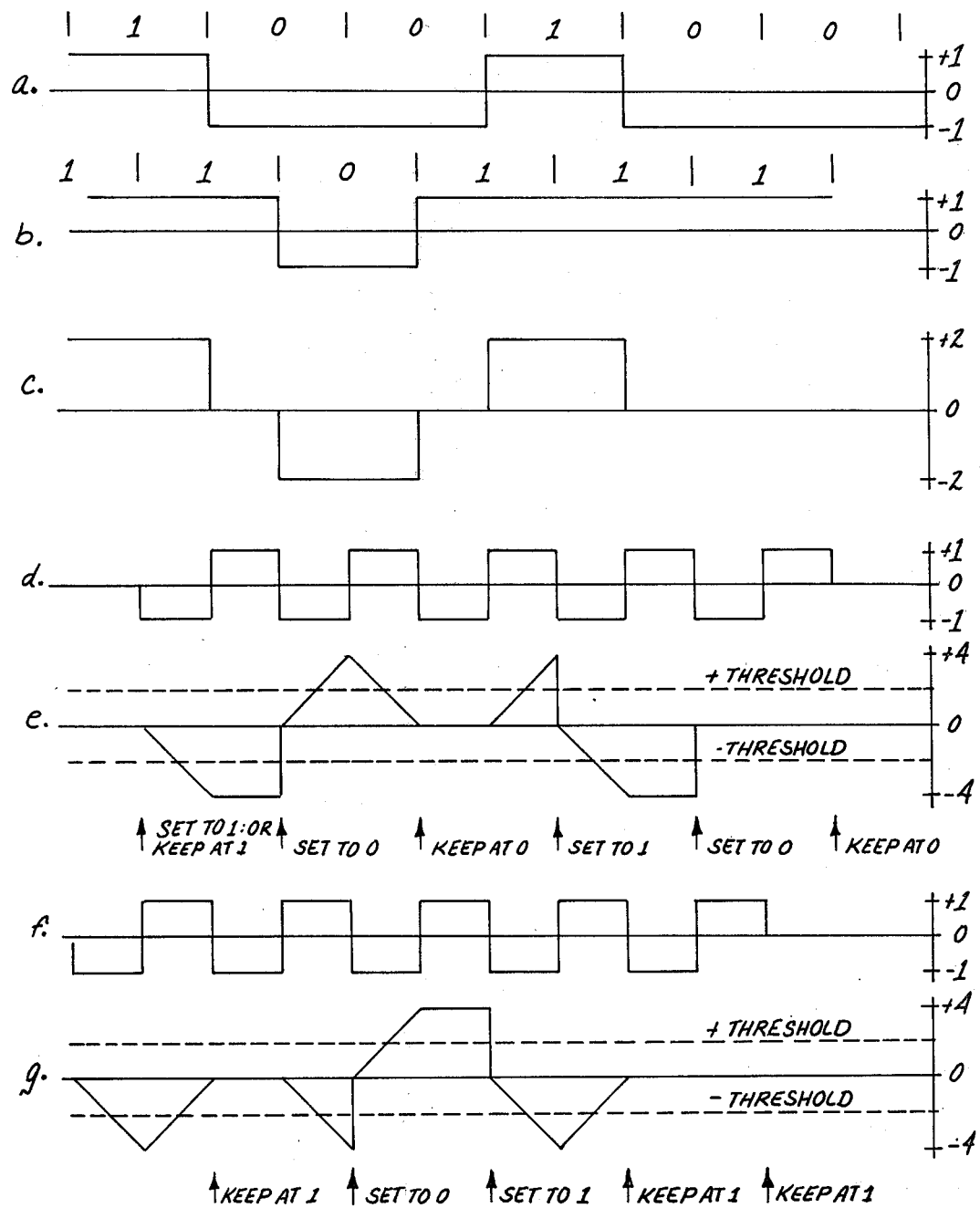
FIG. 3 is a diagram of waveforms illustrating two binary coded bit streams (a., b.), their composite encoded signal (c.), their two correlator signals (d., f.), and the two integral resultant signals (e., g.).

As a further example of the present demultiplexing techique, FIGS. 3a through 3g illustrate the technique with respect to two binary coded data streams, 3a and 3b. Their combined waveform is represented by FIG. 3c. The respective correlator signals are represented by FIGS. 3d and 3f. The multiplied integrated output of the respective correlators is represented by FIGS. 3e and 3g respectively.

Note that the two bit streams as well as their respective correlators are shown phase shifted by 180°. The correlators are centered on the edge transitions of the bit cells, coincident with the transitions in the data signals. The state of the bit in the integral signal is determined at the end of a correlator duty cycle by the state of the previous bit or by the relatively positive or negative resultant state indicating, respectively, a "one" bit or a "zero" bit.

As mentioned above, a 90° phase offset between the two signals is somewhat arbitrarily chosen, although a 180° offset would not work with Manchester code as one track's center transitions would be taking place during the other tracks's edge transition. If each track were separated by 120°, three tracks might be demultiplexed simultaneously with the "center"track being 120° ahead of the track to the "right" and 120° behind the track to the "left". Assuming a plurality of other tracks to the "left" or "right", shifting of the read head in either direction by one track will not alter the phase relationship of the "center"track relative to the side tracks. In this manner, tracks may be spaced so closely together that the read head always reads at least portions of three tracks, but the tracks may always be separated from one another by the present demultiplexing method. The same holds true for data transmission as well as data recording.

The above two examples have been given in relation to tracks of data read from a physical media and formed into a composite by the read head and/or associated electronics. However, the invention is not so limited, as the same demultiplexing technique could also be applied to the art of data transmission, where, instead of a read head reading tracks, two data streams are brought together and multiplexed into a composite in the above-discussed phase shifted arrangement and transmitted. The received composite of two or more signals may then be demultiplexed by multiplying the composite by the appropriately phase-shifted correlator signals.

There is no present theoretical limitation on the number of data streams capable of being demultiplexed, nor on the particular correlator patterns to be used, nor on the particular data code. The only requirement is that the correlator patterns be mutually orthogonal, and individually capable of demultiplexing their respective data streams.

Thus, the present invention permits greater density in recording and reading closely packed data tracks. The techniques are particularly useful in demultiplexing electron beam recorded data, but are equally applicable to other recording media, and to data transmission.

The illustration and discussion contained in the above specification should not be taken as a limitation on the scope of the present invention as claimed in the following claims, in which I claim:

1. A method of demultiplexing a composite signal containing a plurality of data streams, each stream being coded in a polarized code and phase shifted from the other streams by a predetermined phase shift, said method comprising:

providing a correlator signal for each of said plurality of data streams, each of said correlator signals being mutually orthogonal with the other correlator signals and phase shifted from the other correlator signals by the predetermined phase shift of its corresponding data stream; and separately multiplying said composite signal by each of said correlator signals to derive a plurality of resultant signals, each representing the data bits in a respective one of said streams.

2. The method of claim 1 wherein each of said correlator signals comprises a negative segment and a positive segment, the transition between said segments being centered about the bit information transitions of its associated bit stream.

3. The method of either claim 1 or 2 further including integrating the results of said multiplication over the period of the duty cycle of said correlator signal, the relative positive or negative value of the integral at the end of a duty cycle comprising a logical one bit or logical zero bit respectively in the respective stream.

4. The method of claim 3 wherein a relative zero value of the integral at the end of a duty cycle represents no change in bit value.

5. The method of claim 1 wherein said phase shift is 90°.

6. The method of claim 3 wherein said phase shift is 90°.

7. The method of claim 1 wherein said phase shift is 120°.

8. The method of claim 3 wherein said phase shift is 120°.

9. The method of claim 1 wherein said bit streams are recorded tracks on a physical media, and any given track is phase shifted ahead of an adjacent track in one direction on the media and phase shifted behind an adjacent track in the other direction.

10. The method of claim 3 wherein said bit streams are recorded tracks on a physical media, and any given track is phase shifted ahead of an adjacent track in one direction on the media and phase shifted behind an adjacent track in the other direction.

11. Apparatus for reading and demultiplexing one or more tracks of data from a recording media, each track comprising a data stream, each stream being coded in a polarized code and phase shifted from the other tracks by a predetermined phase shift, said apparatus comprising:

read means for simultaneously reading a plurality of said tracks to derive a composite signal representing the sum of the streams; generator means for generating one or more correlator signals, one for each of said tracks to be demultiplexed, each of said one or more correlator signals having the phase shift of its corresponding track; and multiplier means for multiplying said composite signal by each of said one or more correlator signals to derive one or more resultant signals, each representative of the data in a respective one of said tracks being read.

12. Apparatus for demultiplexing a plurality of data streams transmitted as a composite signal over a data channel, each stream being coded in a polarized code and phase shifted from other streams by a predetermined phase shift, said apparatus comprising:

generator means for generating one or more correlator signals, one for each of said streams to be demultiplexed, each of said correlator signals being phase shifted from the others by said predetermined phase shift; and multiplier means for multiplying said composite signal with each of said one or more correlator signals to derive one or more resultant signals, each representative of the data in a respective one of said data streams.

13. The apparatus of claims 11 or 12 wherein said multiplier means comprises an analog filter multiplier means.

14. In a method of demultiplexing one or more data streams from a composite of encoded data streams, each stream in the composite being encoded with a polarized code and phase shifted from the others by a predetermined phase shift, the step of: multiplying the composite signal by a correlator signal for each data stream to be demultiplexed; each correlator signal being mutually orthogonal with the other correlator signals, each correlator signal having the phase shift of its corresponding data stream.

15. The method of claim 14 further including the step of:

integrating the result of the multiplication step for each signal to be demultiplexed.

16. The method of claims 1, 2, 14 or 15 wherein said polarized code is selected from the group consisting of Manchester code and binary code.

17. The method of claim 3 wherein said polarized code is selected from the group consisting of Manchester code and binary code.

18. The apparatus of claims 11 or 12 wherein said polarized code is selected from the group consisting of Manchester code and binary code.

* * * * *